US012128617B2

(12) United States Patent
Fastert et al.

(10) Patent No.: US 12,128,617 B2
(45) Date of Patent: Oct. 29, 2024

(54) CONVEYING INSTALLATION AND TOOL HEAD FOR AN ADDITIVE MANUFACTURING MACHINE, AND ADDITIVE MANUFACTURING MACHINE

(71) Applicant: Airbus Operations GmbH, Hamburg (DE)

(72) Inventors: Claus Fastert, Hamburg (DE); Johannes Born, Hamburg (DE); Konstantin Schubert, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 710 days.

(21) Appl. No.: 16/903,494

(22) Filed: Jun. 17, 2020

(65) Prior Publication Data

US 2020/0398487 A1 Dec. 24, 2020

(30) Foreign Application Priority Data

Jun. 19, 2019 (DE) .................... 10 2019 116 694.2

(51) Int. Cl.
| | | |
|---|---|---|
| *B29C 64/236* | (2017.01) | |
| *B29C 64/118* | (2017.01) | |
| *B29C 64/241* | (2017.01) | |
| *B33Y 30/00* | (2015.01) | |

(52) U.S. Cl.
CPC .......... *B29C 64/236* (2017.08); *B29C 64/118* (2017.08); *B29C 64/241* (2017.08); *B33Y 30/00* (2014.12)

(58) Field of Classification Search
CPC ... B29C 64/236; B29C 64/118; B29C 64/241; B29C 64/209; B29C 64/321; B33Y 30/00
See application file for complete search history.

(56) References Cited

U.S. PATENT DOCUMENTS

| | | | |
|---|---|---|---|
| 5,340,433 A | * | 8/1994 | Crump .................... B29C 41/36 156/218 |
| 5,738,817 A | | 4/1998 | Danforth et al. |
| 5,764,521 A | | 6/1998 | Batchelder et al. |
| 2007/0003656 A1 | | 1/2007 | LaBossiere et al. |

(Continued)

FOREIGN PATENT DOCUMENTS

| | | |
|---|---|---|
| DE | 69626131 T2 | 10/2003 |
| DE | 102015122647 A1 | 6/2017 |

(Continued)

OTHER PUBLICATIONS

European Search Report for corresponding European Patent Application No. 20180834 dated Nov. 24, 2020.
German Office Action; priority document.

*Primary Examiner* — S. Behrooz Ghorishi

(74) *Attorney, Agent, or Firm* — Greer, Burns & Crain, Ltd.

(57) ABSTRACT

A conveying installation by way of which the 3D printing rate can be increased and the reliability of transporting a semi-finished product to be processed in an additive manufacturing machine can be improved. The conveying installation comprises a longitudinal conveying mechanism which conveys the semi-finished product along a conveying direction in that a preferably continuously revolving conveying arrangement, for example a conveyor belt or a conveying belt, engages the semi-finished product in a force-fitting and/or form-fitting manner

13 Claims, 6 Drawing Sheets

(56) References Cited

U.S. PATENT DOCUMENTS

| | | | |
|---|---|---|---|
| 2011/0017860 A1* | 1/2011 | Vaughn | B65H 19/2223 |
| | | | 242/522 |
| 2018/0079139 A1 | 3/2018 | Wang et al. | |
| 2018/0154586 A1* | 6/2018 | Wang | B29C 64/106 |
| 2018/0370130 A1 | 12/2018 | Duffner et al. | |
| 2019/0036337 A1 | 1/2019 | Zhang et al. | |
| 2020/0361149 A1* | 11/2020 | Arao | B29C 64/393 |
| 2020/0398487 A1 | 12/2020 | Fastert et al. | |

FOREIGN PATENT DOCUMENTS

| | | |
|---|---|---|
| DE | 102019116694 A1 | 12/2020 |
| WO | 9728941 A1 | 8/1997 |
| WO | 2015073322 A1 | 5/2015 |

\* cited by examiner

CONVEYING INSTALLATION AND TOOL HEAD FOR AN ADDITIVE MANUFACTURING MACHINE, AND ADDITIVE MANUFACTURING MACHINE

CROSS-REFERENCES TO RELATED APPLICATIONS

This application claims the benefit of the German patent application No. 10 2019 116 694.2 filed on Jun. 19, 2019, the entire disclosures of which are incorporated herein by way of reference.

FIELD OF THE INVENTION

The invention relates to a conveying installation for an additive manufacturing machine. The invention furthermore relates to a tool head for such a device and to an additive manufacturing machine.

BACKGROUND OF THE INVENTION

A typical 3D printing application in the so-called fused filament fabrication (FFF) in which a thermoplastic filament is melted and applied to a printing bed uses plastic materials. The filament may contain additives or reinforcements. The filament cools down and re-solidifies on the printing bed.

An additive manufacturing machine which uses profile bars instead of filament is known from the not previously published German patent application 10 2019 108 123.8. The manufacturing machine disclosed therein uses a conventional gear wheel drive for conveying the profile bars.

SUMMARY OF THE INVENTION

The invention is based on the object of improving the production rate of additive manufacturing machines and the quality of components generated by additive manufacturing machines.

The invention achieves a conveying installation for an additive manufacturing machine, wherein the conveying installation is configured for conveying a semi-finished product which is composed of a manufacturing material that is to be processed by the additive manufacturing machine and has a semi-finished product longitudinal axis, wherein the conveying installation comprises a longitudinal conveying mechanism which is configured for conveying the semi-finished product along a conveying direction parallel to the semi-finished product longitudinal axis, wherein the longitudinal conveying mechanism has at least one running conveying means which extends along the conveying direction and which has a conveying portion that is configured for acquiring a semi-finished product portion of the semi-finished product in such a manner that the semi-finished product is able to be moved in the conveying direction.

It is preferable for the conveying means to be configured as a continuously revolving conveying means.

It is preferable for the semi-finished product to be a filament and/or a profile bar.

It is preferable for the running conveying means to be a conveying belt or a conveyor belt.

It is preferable for the conveying portion to be disposed on a load strand of the running conveying means.

It is preferable for the longitudinal conveying mechanism to have a deflection roller which deflects the conveying means.

It is preferable for the longitudinal conveying mechanism to have a drive roller which engages the conveying means so as to drive the conveying means.

It is preferable for the longitudinal conveying mechanism to have a tensioning installation which keeps the conveying means under tension.

It is preferable for the longitudinal conveying installation to have a contact pressure installation which is configured for pushing the conveying means against the semi-finished product so as to move the semi-finished product.

It is preferable for the contact pressure installation to have a fluid chamber which is able to be impinged with a fluid pressure, is preferably able to be deformed by the fluid pressure and which in an impinged state is configured for urging the conveying means in the direction toward the semi-finished product so as to move the semi-finished product.

It is preferable for the contact pressure installation to have a fluid chamber which is able to be impinged with a fluid pressure, is preferably able to be deformed by the fluid pressure and which in a non-impinged state is configured for not exerting on the conveying means a force which is sufficient for moving the semi-finished product.

It is preferable for the contact pressure installation to have at least one contact pressure roller and one elastic element which is configured for urging the contact pressure roller in the direction toward the semi-finished product such that the conveying means engages the semi-finished product.

It is preferable for the conveying means to be configured in such a manner that the conveying means when pushing on the semi-finished product hugs the semi-finished product and in any case partially encompasses, particularly engages in any case to an extent of one fifth, more particularly in any case to an extent of one third, the circumferential face of the semi-finished product.

It is preferable for the deflection roller and/or the drive roller and/or the contact pressure roller to have a profiled feature which corresponds to the contour of the semi-finished product.

The conveying installation preferably comprises a first running conveying means and a second running conveying means which conjointly define a conveying duct through which the semi-finished product by virtue of the movement of the conveying means is able to be conveyed in the conveying direction.

The conveying installation preferably comprises a rotating mechanism which for driving the longitudinal conveying mechanism is configured in such a manner that the semi-finished product is able to be rotated about the semi-finished product longitudinal axis thereof It is preferable for the rotating mechanism to have at least one turntable which is able to be driven and on which the longitudinal conveying mechanism is supported such that the longitudinal conveying mechanism when driving the turntable carries out a rotating movement.

It is preferable for the rotating mechanism, in particular the turntable, to have an infeed opening for the semi-finished product so as to feed the semi-finished product to the conveying means.

The invention achieves a tool head for assembly and use in an additive manufacturing machine, wherein the tool head comprises an entry region for a semi-finished product, which is composed of a manufacturing material that is to be processed by the additive manufacturing machine and has a semi-finished product longitudinal axis, an exit region, which is configured for depositing molten manufacturing material on a printing bed so as to manufacture a component, as well as a preferred conveying installation that is configured for conveying the semi-finished product from the entry region to the exit region and for holding the semi-finished product on the tool head.

The invention achieves an additive manufacturing machine which is configured for carrying out a molten layering method for manufacturing a component, in particular for an aircraft, wherein the manufacturing machine is configured for processing manufacturing material tailored so as to form profile bars, wherein the manufacturing machine comprises a preferred conveying installation for conveying the semi-finished product and/or a preferred tool head for processing the semi-finished product.

The most prevalent 3D printing application in the so-called fused filament fabrication (FFF) in which a thermoplastic filament is melted and applied to a printing bed uses plastic materials. The filament may contain additives or reinforcements. The filament cools down and re-solidifies on the printing bed.

The filament is typically provided as a coil which is assembled close to the printing head or on an immovable location of the 3D printer. The filament herein is fed to the printing head by way of an adequate guide system, for example by means of a Bowden cable. This enables the use of comparatively long filaments but is associated with certain limitations in terms of the filaments used.

It can thus be a limitation that the filaments used have a rather small diameter (typically between 0.8 mm and less than 3 mm) so as to permit the winding and guiding by way of acceptable bending radii. The achievable deposition rates may be limited by virtue of the small diameter. Alternative methods such as, for example, the use of added yarns or in-situ impregnation, in particular by virtue of the additional complexity of the method, can be significantly more complex in terms of the parts quality obtainable.

By virtue of the continuous configuration of the filaments it may additionally be necessary to carry out a cutting operation for fiber-reinforced filaments, for example when a part cannot be generated in a single uninterrupted fiber path or filament path, respectively. While cutting devices of this type do exist, this approach may be less desirable because the cutting of the fibers may pose a limitation in terms of the continuous operation of the 3D printer. This applies in particular when materials such as carbon fibers are used.

In another case, the accumulation of degraded thermoplastic material at the exit of the printer nozzle may represent an issue.

Furthermore, the thicker the filament the longer the latter has to be heated (or the method has to be decelerated) so as to guarantee complete melting of the filament. The risk and the prevalence of degradation may increase on account thereof The degradation modifies the viscosity of the material, for example, such that the material can accumulate on the nozzle or be pushed into the component, this being undesirable and potentially compromising the printing quality. This is typically more critical in so-called "(endless) fiber reinforced printing" in which the cleaning of the nozzle is more complicated than in the case of an endless filament which cannot be cut directly at the nozzle.

A printing device for layered melting with and without fiber reinforcements is known per se and comprises a printing head which is disposed so as to be able to move relative to a printing bed. The printing head can contain a filament driving installation so as to by means of a plurality of drive wheels move a filament wound on a coil toward the hot end. A cutting device by which the filament can be chopped can be provided at a location which in the direction of material flow is ahead of the hot end. If required, a filament guide can be additionally interposed between the filament driving device and the hot end. A heating element which heats the filament to melting temperature and deposits the filament on the printing bed by way of an exit nozzle is located at the hot end.

The sequence and the functioning principle of the components may be different. The cutting device can also be dispensed with when no endless fiber reinforcement is used.

The profile bar can presently be conveyed by two belts. A drive roller of the belt mechanism is preferably configured as the rotor of an external-rotor motor such that no gearbox is necessary for driving the belt. The rollers can additionally have a groove which is in particular disposed so as to be centric and/or corresponds to the cross section of the (reinforced) profile bar.

The belt mechanism can additionally be disposed on a rotatable ring mount. A rotation of the profile bar can therefore take place, on account of which the profile bar by virtue of fiber length compensation can better be placed about curves.

The concepts described herein relate to the field of 3D printing. The particular focus is on different types of 3D printing such as fused filament fabrication (FFF), additive layer manufacturing (ALM), or selective laser sintering (SLS). The concepts described herein are, in particular, focused on increasing the deposition rate, or the positioning rate, respectively, in the printing process using non-reinforced and reinforced materials. This can, in particular, also relate to the so-called endless fiber reinforcements in which the length of the fiber corresponds substantially to the extent of the semi-finished product to be processed, or to the component made therefrom, respectively. The measures discussed herein are particularly suitable for the measures of the not previously published German patent application 10 2019 108 123.8.

BRIEF DESCRIPTION OF THE DRAWINGS

Exemplary embodiments will be explained in more detail by means of the appended schematic drawings in which.

DETAILED DESCRIPTION OF THE PREFERRED EMBODIMENTS

Figure 1:
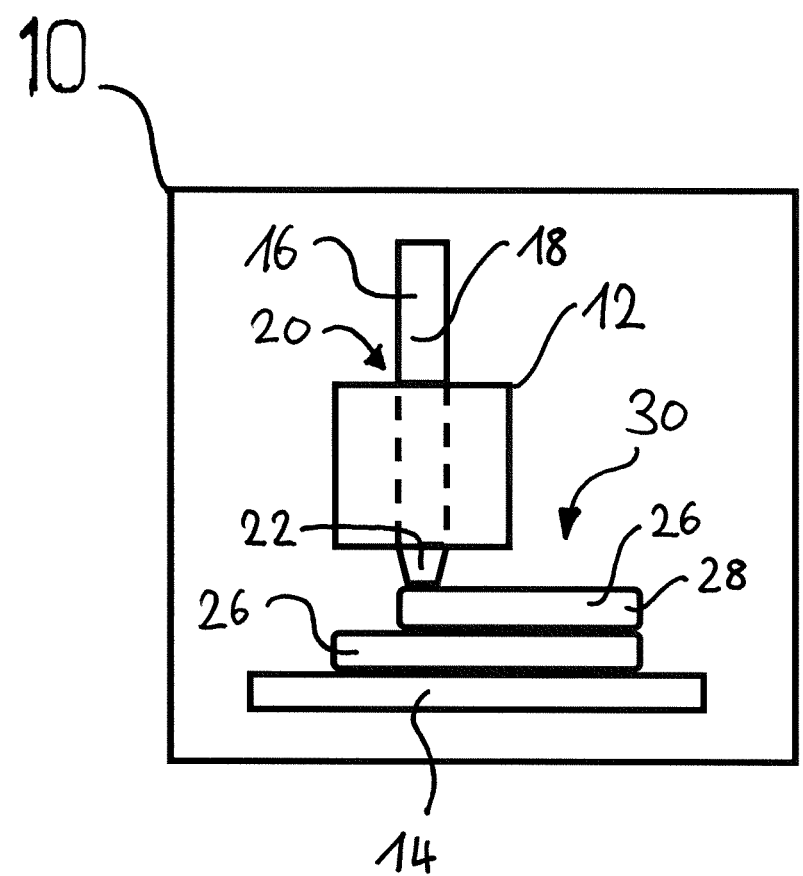
FIG. 1 shows an exemplary embodiment of an additive manufacturing machine.

Reference hereunder is made to FIG. 1 which schematically shows an exemplary embodiment of an additive manufacturing machine 10. The additive manufacturing machine 10 has a tool head 12 which is disposed so as to be able to move relative to a printing bed 14. The relative movement between the tool head 12 and the printing bed 14 herein can result from a movement of the tool head as well as from a movement of the printing bed.

The tool head 12, by means of a conveying installation 24, is configured for conveying a semi-finished product 16 which is composed of a manufacturing material and has a semi-finished product longitudinal axis, for example a profile bar 18 having a profile bar longitudinal axis, from an entry region 20 to an exit region 22.

The entry region 20 is configured for receiving the profile bar 18 and for feeding the latter to the conveying installation 24. The conveying installation 24, by virtue of control commands, conveys the profile bar 18 to the exit region 22 where the profile bar 18 by means of a heating installation 23 is heated so as to melt, and thereafter is deposited on the printing bed 14 or on an already existing component layer 26 by an exit nozzle 25, so as to thereafter form a further component layer 28 and successively form the desired component 30.

Figure 2:
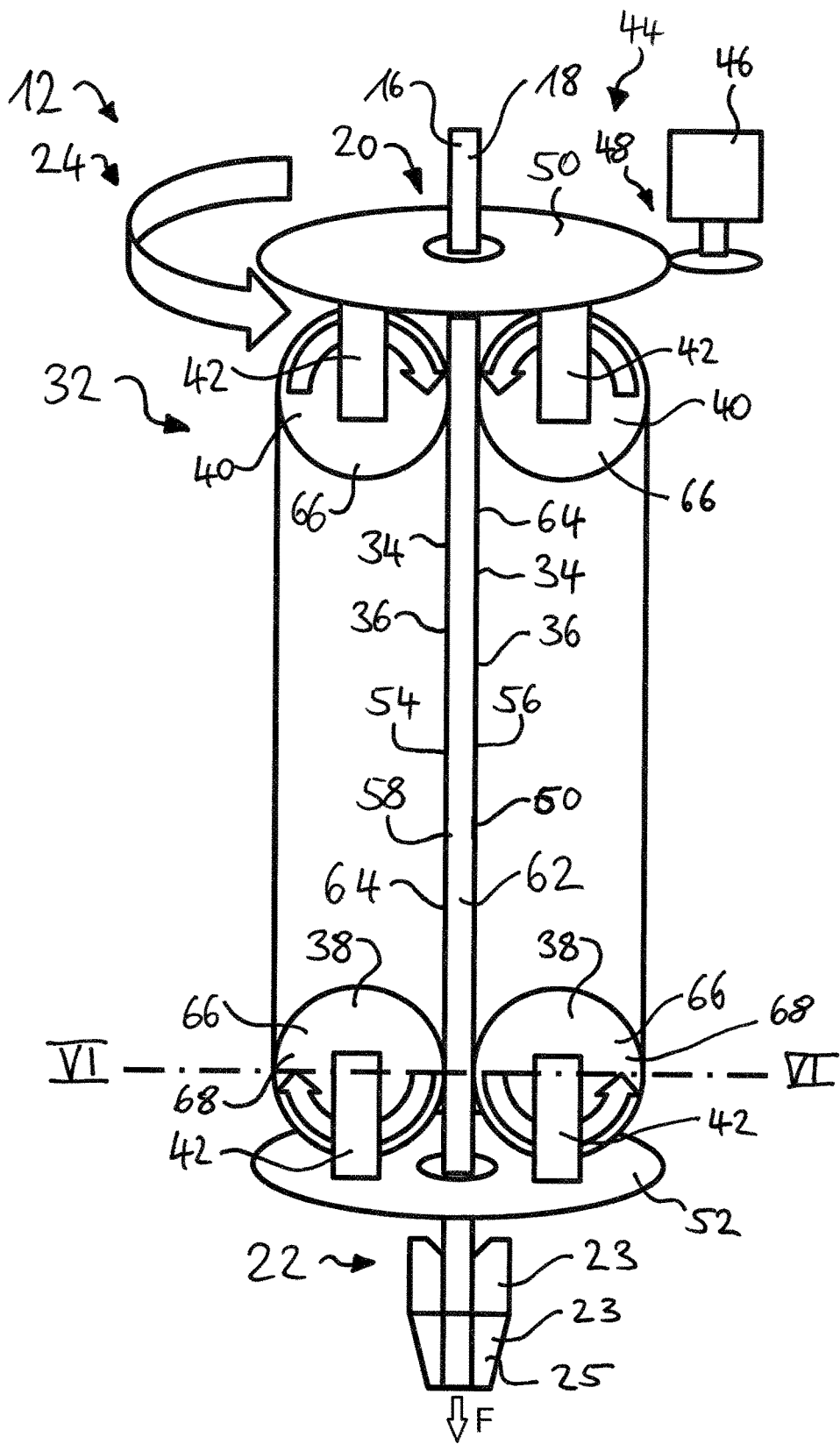
FIG. 2 shows an exemplary embodiment of a tool head.

Reference hereunder is, in particular, made to FIG. 2 which illustrates in more detail the tool head 12, or the conveying installation 24, respectively.

The conveying installation 24 has a longitudinal conveying mechanism 32. The longitudinal conveying mechanism 32 is configured for conveying the profile bar 18 along a conveying direction F from the entry region 20 to the exit region 22.

The longitudinal conveying mechanism 32 for conveying the profile bar 18 comprises at least one conveying means 34 which extends so as to be parallel to the conveying direction F. The conveying means 34 is configured as a conveying belt or a conveyor belt 36, for example. The conveying means 34 is, in particular, provided as a continuously revolving conveying means 34.

The longitudinal conveying mechanism 32 comprises at least one drive roller 38 which engages the conveying means 34 so as to drive the latter. Besides the at least one drive roller 38, the longitudinal conveying mechanism 32 comprises at least one deflection roller 40 which deflects the conveying means 34 back onto the drive roller 38. The deflection roller 40 can moreover be configured as a drive roller 38.

The drive roller 38 and the deflection roller 40 are provided on the longitudinal conveying mechanism 32 so as to be mutually spaced apart in the conveying direction F.

The longitudinal conveying mechanism 32 can moreover have a tensioning installation 42 which keeps the conveying means 34 under tension. The tensioning installation 42, on account of an adjustable spacing of the drive roller 38 from the deflection roller 40, can tension the conveying means 34, on the one hand Alternatively or additionally, the tensioning installation 42 can have at least one tension roller which effects the tensioning of the conveying means 34 on the side that faces away from the profile bar 18.

The conveying installation 24 can furthermore comprise a rotating mechanism 44. The rotating mechanism 44 is configured for rotating the profile bar 18 about the profile bar longitudinal axis of the latter in that the force is transmitted to the profile bar 18 by way of the conveying means 34.

The rotating mechanism 44 has a rotary drive actuator 46, for example a motor. The driving power of the rotary drive actuator 46 is transmitted to a turntable 50 by means of a rotary drive gearbox 48.

The longitudinal conveying mechanism 32 is preferably supported on the turntable 50. The drive roller 38 and/or the deflection roller 40 are/is, in particular, disposed on the turntable 50.

The rotating mechanism 44 can furthermore have a further turntable 52 which in the conveying direction F is spaced apart from the turntable 50 and on which a drive roller 38 and/or a deflection roller 40 are/is likewise disposed.

The entry region 20 is furthermore provided on the turntable 50, while the exit region 22 can be disposed on the further turntable 52.

As can, in particular, be seen from FIG. 2, the longitudinal conveying mechanism 32 preferably comprises a first conveying means 54 and a second conveying means 56. The first conveying means 54 comprises a first conveying portion 58, and the second conveying means 56 comprises a second conveying portion 60. The first conveying portion 58 and the second conveying portion 60 are disposed so as to face one another and conjointly define a conveying duct 62 in which the profile bar 18 can be received for conveying. Each conveying portion 58, 60 is preferably provided on a load strand 64 of the conveying means 34.

The functioning mode of the conveying installation 24 will be explained in more detail hereunder by means of FIG. 2.

First, the profile bar 18 is inserted into the entry region 20. The profile bar 18 thereafter is preferably engaged by a pair of conveying rollers 66, such as, for example, the drive roller 38 and/or the deflection roller 40, and introduced into the conveying duct 62. The conveying means 34 can hug the circumferential face of the profile bar and thus engage a large part of the circumferential face of the profile bar. The conveying means 34 conveys the profile bar in the direction toward the exit region 22. In the proximity of the exit region 22, the profile bar 18 passes a second pair of conveying rollers 66, for example a drive roller 38 and/or a deflection roller 40, and thereafter enters the exit region 22 through the further turntable 52.

In the exit region 22, the profile bar 18 is melted by the heating installation 23 and by means of the exit nozzle 25 ejected in the direction toward the printing bed 14.

The profile bar 18 is thus engaged by each conveying portion 58, 60 along the entire conveying duct 62. Each conveying portion 58, 60 accordingly extends from the conveying roller 66 on the turntable 50 up to the conveying roller 66 on the further turntable 52.

On account of the force-transmitting connection between the conveying means 34 and the profile bar 18, the torque can be transmitted to the profile bar 18 by activating the rotating mechanism 44 such that the profile bar 18 can be rotated about the profile bar longitudinal axis of the latter.

Figure 6:
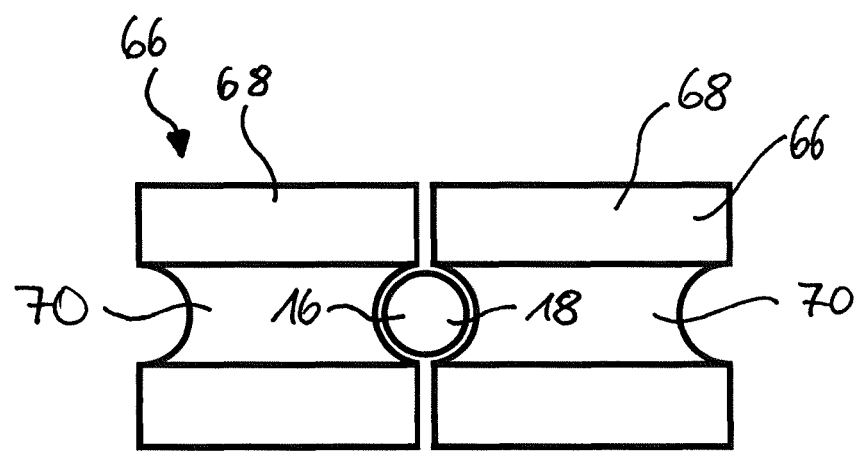
FIG. 6 shows an exemplary embodiment of conveying rollers.

Reference hereunder is made to FIG. 6 which shows a cross section along the line VI-VI from FIG. 2. As can be seen in FIG. 6, the conveying rollers 66 are configured as profiled rollers 68. Each profiled roller 68 comprises a profile groove 70 which is adapted to the cross-sectional shape of the profile bar 18. The profile bar 18 in the present example has a circular cross section so that the profile groove 70 has a semi-circular shape. However, other cross-sectional shapes of the profile bar, for example elliptic, rectangular, or square, are also conceivable. The profile groove 70 in this instance has the correspondingly complementary shape which is adapted to the cross section of the profile bar 18.

Figure 3:
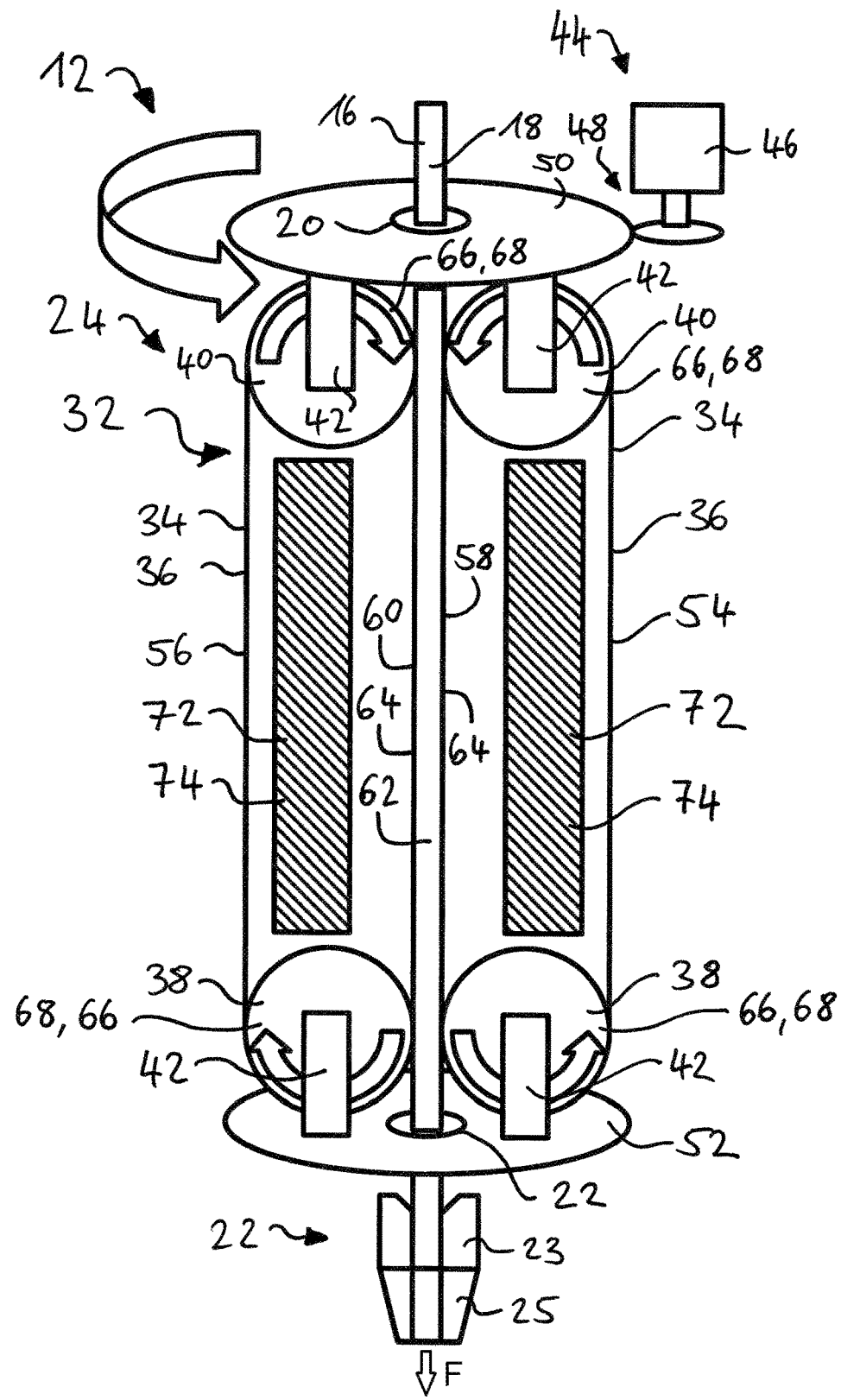
FIG. 3 and FIG. 4 show a further exemplary embodiment of a tool head.
Figure 4:
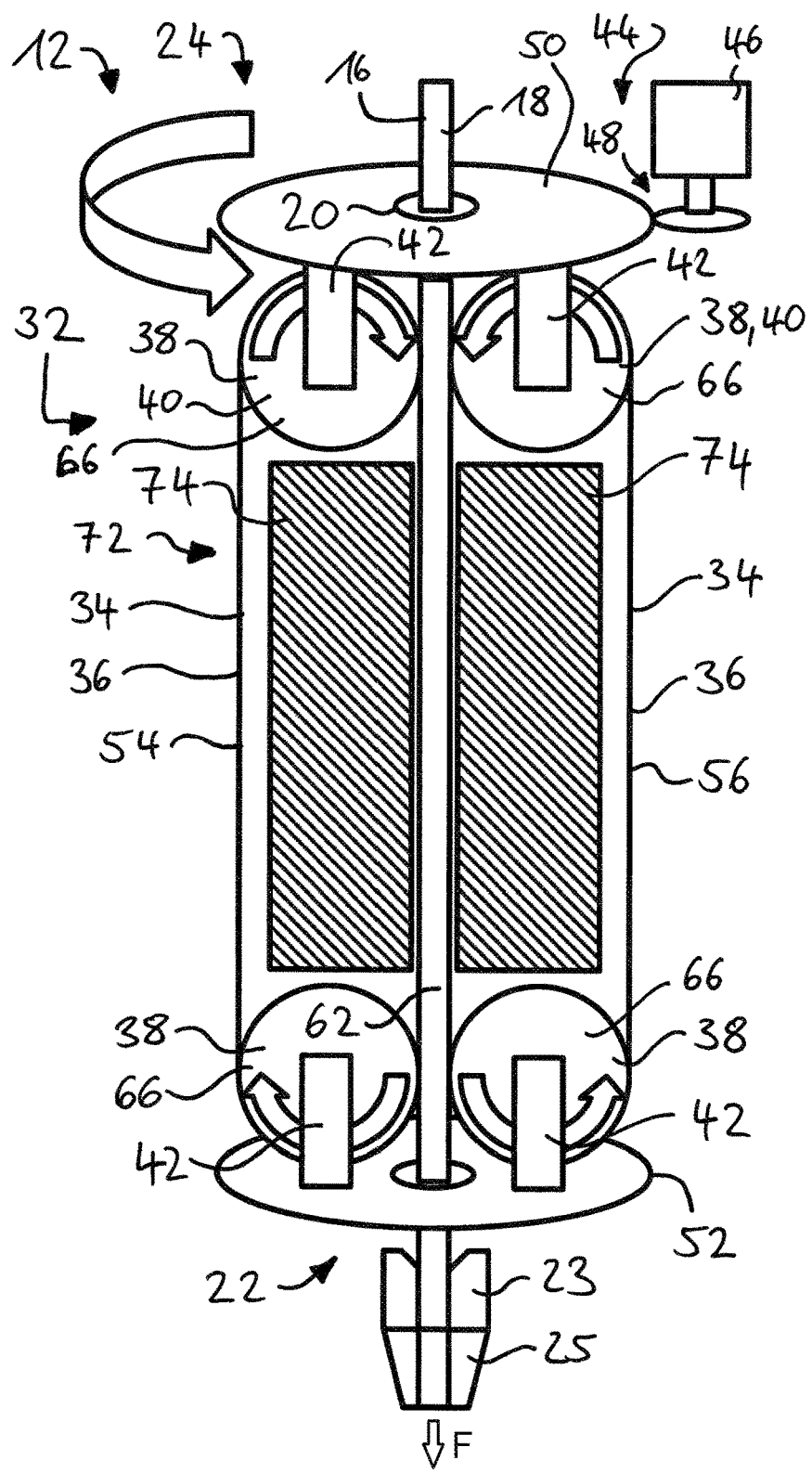
Figure 5:
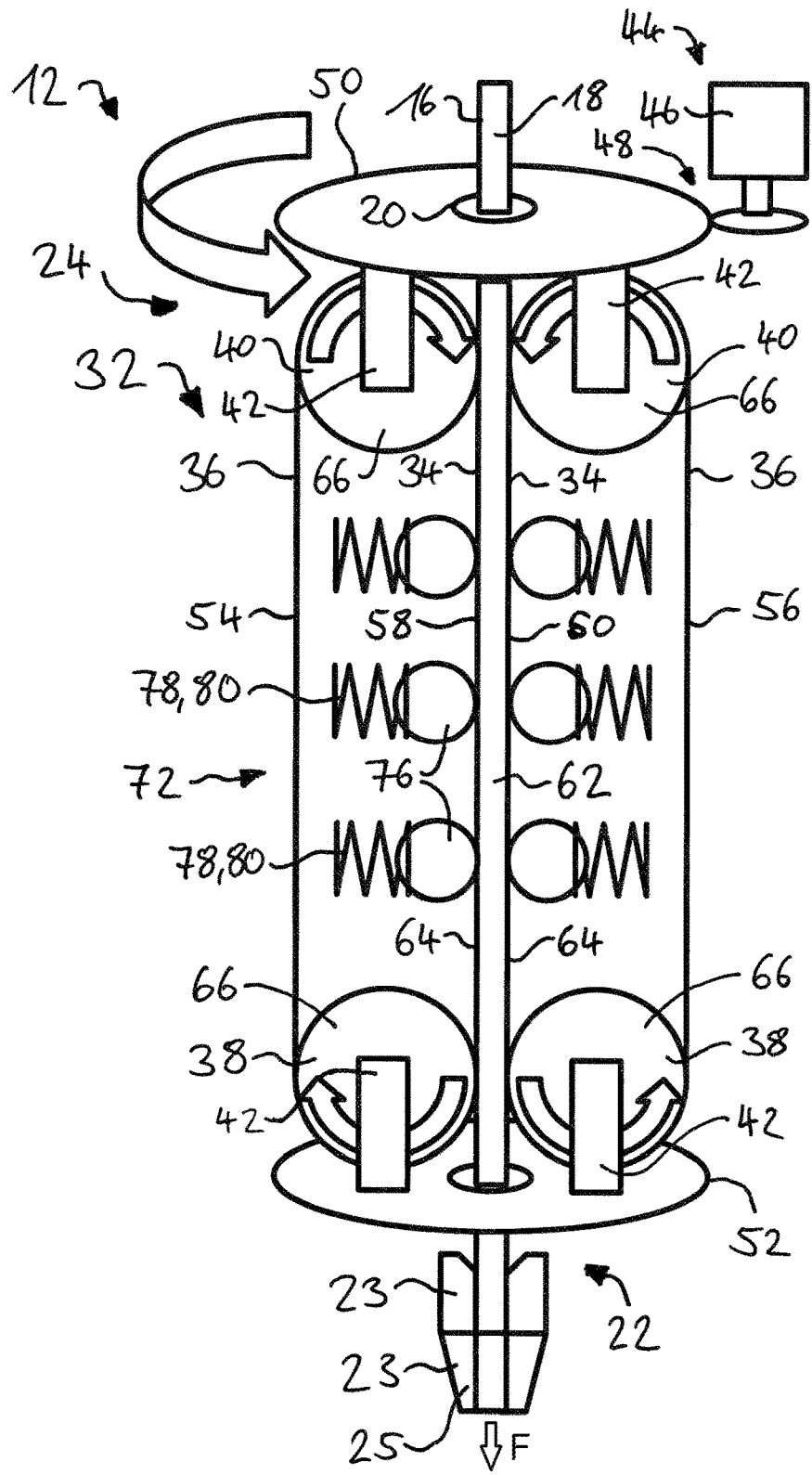
FIG. 5 shows a further exemplary embodiment of a tool head.

Reference hereunder is made to FIGS. 3 to 5 which show further exemplary embodiments of the tool head 12. Each tool head 12 is described only to the extent to which the tool head 12 differs from the tool head 12 from FIG. 2. The conveying installation 24 comprises a contact pressure installation 72 which is configured for pushing the conveying means 34 against the profile bar 18.

As is illustrated in more detail in FIGS. 3 and 4, the contact pressure installation 72 can have a fluid chamber 74 which is able to be deformed by a fluid pressure. The fluid chamber 74 in a non-impinged state (FIG. 3) is released from the conveying means such that a configuration as in the tool head 12 from FIG. 2 results. In order to improve the transmission of force from the conveying means 34 to the profile bar 18, the fluid chamber 74 can be impinged with a fluid pressure (FIG. 4) such that the fluid chamber 74 urges the conveying means 34 against the profile bar. The fluid chamber 74 is preferably configured as a deformable fluid cushion 75.

Alternatively or additionally, the contact pressure installation 72 can have a plurality of contact pressure rollers 76 which by virtue of an elastic element 78, for example a spring 80, urge the conveying means 34 in the direction toward the profile bar 18, as is illustrated in more detail in FIG. 5.

A conveying installation by way of which the 3D printing rate can be increased and the reliability of transporting a semi-finished product to be processed in an additive manufacturing machine can be improved is specified by the measures described above. The conveying installation comprises a longitudinal conveying mechanism which conveys the semi-finished product along a conveying direction in that a preferably continuously revolving conveying means, for example a conveyor belt or a conveying belt, engages the semi-finished product in a force-fitting and/or form-fitting manner While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

List of reference signs:

10 Additive manufacturing machine
12 Tool head
14 Printing bed
16 Semi-finished product
18 Profile bar
20 Entry region
22 Exit region
23 Heating installation
24 Conveying installation
25 Exit nozzle
26 Component layer
28 Further component layer
30 Component
32 Longitudinal conveying mechanism
34 Conveying means
36 Conveyor belt
38 Drive roller
40 Deflection roller
42 Tensioning installation
44 Rotating mechanism
46 Rotary drive actuator
48 Rotary drive gearbox
50 Turntable
52 Further turntable
54 First conveying means
56 Second conveying means
58 First conveying portion
60 Second conveying portion
62 Conveying duct
64 Load strand
66 Conveying roller
68 Profiled roller
70 Profile groove
72 Contact pressure installation
74 Fluid chamber
75 Fluid cushion
76 Contact pressure roller
78 Elastic element
80 Spring

The invention claimed is:

1. A conveying installation for an additive manufacturing machine,
wherein the conveying installation is configured to convey a semi-finished product which is composed of a manufacturing material that is to be processed by the additive manufacturing machine and has a semi-finished product longitudinal axis,
wherein the conveying installation comprises a longitudinal conveying mechanism which is configured for conveying the semi-finished product along a conveying direction parallel to the semi-finished product longitudinal axis,
wherein the longitudinal conveying mechanism has at least one running conveying means which extends along the conveying direction and which has a conveying portion that is configured to acquire a semi-finished product portion of the semi-finished product such that the semi-finished product is able to be moved in the conveying direction,
the conveying installation further comprising:
a rotating mechanism which for driving the longitudinal conveying mechanism is configured such that the semi-finished product is able to be rotated about the semi-finished product longitudinal axis thereof,
wherein the rotating mechanism has an upper turntable and a lower turntable in relation to and external to the longitudinal conveying mechanism, such that the longitudinal conveying mechanism is disposed therebetween, at least one of the upper and lower turntables is driven, and the longitudinal conveying mechanism is supported on the upper and lower turntables such that the longitudinal conveying mechanism, when conveying the semi-finished product in the conveying direction, is rotated by the rotating mechanism about the semi-finished product longitudinal axis, and the longitudinal conveying mechanism imparts rotation to the semi-finished product.

2. The conveying installation as claimed in claim 1, wherein the at least one running conveying means is a conveying belt or a conveyor belt.

3. The conveying installation as claimed in claim 1, wherein the conveying portion is disposed on a load strand of the at least one running conveying means.

4. The conveying installation as claimed in claim 1, wherein the longitudinal conveying mechanism has at least one of:
a deflection roller which deflects the at least one running conveying means;

a drive roller which engages the at least one running conveying means so as to drive the at least one running conveying means; and a tensioning installation which keeps the at least one running conveying means under tension.

5. The conveying installation as claimed in claim 4, wherein the at least one of the deflection roller, the drive roller, and the contact pressure roller has a profiled feature which corresponds to a contour of the semi-finished product.

6. The conveying installation as claimed in claim 1, wherein the at least one running conveying means is configured such that the at least one running conveying means, when pushing on the semi-finished product, hugs the semi-finished product and, in any case, partially encompasses a circumferential face of said semi-finished product.

7. The conveying installation as claimed in claim 1, wherein the at least one running conveying means is configured such that the at least one running conveying means, when pushing on the semi-finished product, hugs the semi-finished product and, in any case, partially encompasses and engages to an extent of one fifth, a circumferential face of said semi-finished product.

8. The conveying installation as claimed in claim 1, wherein the at least one running conveying means is configured such that the at least one running conveying means, when pushing on the semi-finished product, hugs the semi-finished product and, in any case, partially encompasses and engages to an extent of one third, a circumferential face of said semi-finished product.

9. The conveying installation as claimed in claim 1, comprising a first running conveying means and a second running conveying means which conjointly define a conveying duct through which the semi-finished product by virtue of a movement of the first running conveying means and the second running conveying means is able to be conveyed in the conveying direction.

10. The conveying installation as claimed in claim 1, wherein the upper turntable has an infeed opening for the semi-finished product to feed the semi-finished product to the at least one conveying means.

11. A tool head for assembly and use in an additive manufacturing machine, wherein the tool head comprises:

an entry region for a semi-finished product, which is composed of a manufacturing material that is to be processed by the additive manufacturing machine and has a semi-finished product longitudinal axis, an exit region, which is configured for depositing molten manufacturing material on a printing bed so as to manufacture a component, and a conveying installation as claimed in claim 1 that is configured for conveying the semi-finished product from the entry region to the exit region and for holding said semi-finished product on the tool head.

12. An additive manufacturing machine which is configured to carry out a molten layering method for manufacturing a component, wherein the manufacturing machine is configured for processing manufacturing material tailored so as to form profile bars, wherein the manufacturing machine comprises a tool head as claimed in claim 11 to process the semi-finished product.

13. An additive manufacturing machine which is configured to carry out a molten layering method for manufacturing a component, wherein the manufacturing machine is configured for processing manufacturing material tailored so as to form profile bars, wherein the manufacturing machine comprises a conveying installation as claimed in claim 1 to convey the semi-finished product.

* * * * *